(12) United States Patent
Scrivens

(10) Patent No.: US 6,254,243 B1
(45) Date of Patent: Jul. 3, 2001

(54) COMPOSITE POLYMERIC REFLECTORS

(76) Inventor: Walter A. Scrivens, 1618 College St., Newberry, SC (US) 29108

(*) Notice: Subject to any disclaimer, the term of this patent is extended or adjusted under 35 U.S.C. 154(b) by 0 days.

(21) Appl. No.: 09/658,350

(22) Filed: Sep. 11, 2000

Related U.S. Application Data

(60) Provisional application No. 60/159,130, filed on Oct. 12, 1999.

(51) Int. Cl.⁷ .................................................. G02B 5/08
(52) U.S. Cl. ................................... 359/883; 359/884
(58) Field of Search ................................. 359/883, 884; 156/163, 245, 229, 196, 280, 297, 160, 242; 428/429, 446, 447, 428, 432, 433, 434; 264/1.9, 1.7, 2.3, 2.4, 2.6, 255

(56) References Cited

U.S. PATENT DOCUMENTS

| | | |
|---|---|---|
| 3,306,767 | 2/1967 | Snyder . |
| 3,691,263 | 9/1972 | Stoy et al. . |
| 4,265,937 * | 5/1981 | Kameya et al. ............... 427/163 |
| 4,268,332 | 5/1981 | Winders . |
| 4,340,646 | 7/1982 | Ohno et al. . |
| 4,358,507 | 11/1982 | Senaha et al. . |
| 4,627,256 | 12/1986 | Myer . |
| 5,043,106 | 8/1991 | Drummond . |
| 5,179,471 * | 1/1993 | Caskey et al. ............... 359/603 |
| 5,428,483 | 6/1995 | Sato et al. . |
| 5,665,520 * | 9/1997 | Yoshioka et al. ............ 430/270.13 |
| 5,702,649 | 12/1997 | Taylor . |

FOREIGN PATENT DOCUMENTS

19716968C1   10/1998   (DE) .

OTHER PUBLICATIONS

Liquid Mirrors, published in Feb. 1994 by Ermanno F. Borra in Scientific American.

Make an Eposy Mirror, published Mar. 14, 2000 at http://www.geocities.com/Cape–Canaveral/Lab/7747/epoxy.htm.

A Method for Producing Concave Paraboloidal Mirrors, published in 1980 by Lindblom et al. in Physica Scripta.

Large Off–Axis Epoxy Paraboloids for Millimetric Telescopes and Optical Light Collectors, published in Jan. 1993 by Alvarez et al. in Review of Scientific Instrumentation.

A Method for Manufacturing Parabolic Mirrors, published in Apr.–Jul. 1956 by Paul B. Archibald in The Journal of Solar Energy Science and Engineering.

Method for Fabricating Paraboloical Mirrors, published in Feb. 1958 by Hass et al. in Journal of the Optical Society of America.

* cited by examiner

*Primary Examiner*—Mohammad Sikder
(74) *Attorney, Agent, or Firm*—Michael A Mann; Nexsen Pruet Jacobs & Pollard

(57) ABSTRACT

A method for making polymeric reflectors and parabolic reflectors in particular. The reflector is made by forming a series of layers (12, 14, 16, 18, and 20) that are progressively thinner with the final polymeric layer (20) being about one millimeter in thickness. The reflector is then coated with a reflective layer (22) by vapor deposition. To make a parabolic reflector, the layers are spun cast at a constant, preselected rate throughout the process, including during the curing of each layer. Layer formation is made in a controlled, particulate-free environment and additives can be used to increase stiffness, decrease weight, and reduce stresses during curing.

7 Claims, 3 Drawing Sheets

COMPOSITE POLYMERIC REFLECTORS

PRIORITY CLAIM

This application claims the benefit of U.S. Provisional Application No. 60/159,130, filed on Oct. 12, 1999, which is incorporated herein by reference.

FIELD OF THE INVENTION

The present invention relates to reflectors. In particular, it relates to polymeric reflectors, especially parabolic reflectors.

BACKGROUND OF THE INVENTION

It has been known for some time that a liquid in a container when spun at a constant rotational velocity assumes a parabolic cross-section. The forces on the liquid surface are constant normal to the surface (because of gravity) and vary with the square of the distance radially (centripetal acceleration).

A parabolic surface is ideally suited as an imaging optical device, being perfectly shaped for directing light to a focal point in front of the surface. This principal has been discussed a number of times over the last hundred years or so, and liquid metal techniques are used today by E. F. Borra to make primary mirrors for telescopes using mercury. These mirrors are of high quality, as befits their use in astronomical observations. The unfortunate disadvantages of liquid metal mirrors are obvious: they must be spinning continuously on an axis that is normal to a gravitational field, so they can observe only in one direction; and they cannot be used in space, where gravitational forces are all but eliminated.

The obvious extension of the Borra technique in liquid metal technology is to somehow solidify the liquid while it is spinning so as to preserve the parabolic shape. This process is known as spin casting and is often used to pre-form large, astronomical glass mirrors by slowly cooling a spinning dish of molten glass over a period of months. By spin casting glass mirrors, much of the grinding normally necessary when rough-forming the mirrors is avoided. The spun-cast surface is still imperfect, however, and requires polishing to obtain a dimensionally acceptable surface.

Spin casting has been applied recently to the casting of the world's largest monolithic telescope mirror, one of the 8.4 meter mirrors for the Large Binocular Telescope (LBT). While spin casting of molten glass for telescope-grade reflectors is known, somewhat surprisingly, there are only a few publications describing attempts to spin cast polymeric reflectors. Furthermore, none of these attempts have produced a practical, optically precise plastic reflector.

There are no theoretical reasons why one cannot spin cast very accurate polymeric reflectors using thermosetting plastics. A rotating container of such polymeric material takes on the characteristic parabolic shape, as does any other liquid, and it will cure while spinning. Furthermore, there are a number of advantages to polymeric reflectors. Polymeric reflectors would be considerably lighter in weight than glass mirrors—one-fourth the weight of similarly sized glass mirrors. Plastic composites are also much tougher than glass, being able to withstand much greater physical shocks without cracking or shattering. Both of these properties make plastic mirrors ideally suited for air or space-borne systems where weight is a critical factor and optical components need to withstand sudden accelerations and decelerations. Spin casting techniques also allow for the formation of parabolic optics of extreme curvature and short focal length. Such reflectors, indeed the total optical system, could be housed much more compactly than conventional, longer focal length optical systems, and the payload of the optical system would be reduced as well.

Additionally, very short focal length reflectors have the potential to replace many of the silicon lens systems used on planes and satellites today for infrared imaging. Short focal length, lightweight reflectors are also highly desirable as portable optical devices for use by individuals in the field. Polymeric, parabolic reflectors, mounted in an optical housing with appropriate secondary optics, for example, can be used as terrestrial telescopes or telephoto lenses.

However, in practice, making such mirrors is not a simple matter. Shrinkage and exotherms during polymerization create stresses that deform the surface of the plastic. Curing must be done under very controlled conditions of temperature and atmosphere for best homogeneity. Finally, not all polymers will produce reflectors having a high modulus and strength or a low coefficient of thermal expansion, all of which are necessary in any optical device.

Thus, there remains a need for an effective method for making high quality polymeric reflectors and parabolic reflectors in particular.

SUMMARY OF THE INVENTION

The present invention is a method for making polymeric reflectors, and parabolic reflectors in particular, comprising the steps of building up the mirror in progressively thinner layers and then aluminizing the final product to create a reflective surface. For parabolic reflectors, there is the additional step of rotating a container at a constant rate, one selected to produce the desired parabolic profile, during the build up of layers. Each layer is cured before forming the next one and preferably while the rotation of the reflector assembly continues at the preselected rate.

In the initial layer, that layer which forms the backing of the mirror rather than the reflective surface, hollow glass microspheres and fibers may be added to the resin to reduce weight and add stiffness. Intermediate layers, being progressively thinner than the initial layer, can simply be made of resin, but other additives can be incorporated into the resin composition of each layer to achieve various goals such as the reduction of curing stresses. The uppermost layer is made of a specially formulated, high-purity polymer Finally, the uppermost layer, when cured, is aluminized via vacuum vapor deposition to provide a highly reflective surface. The entire process is done in a dust free, vibration-free environment.

An important feature of the invention is the use of progressively thinner layers to achieve the desired geometry in the cured product. The use of layers allows greater control over the final results because it minimizes the effects of shrinkage in the subsequent, thinner layers. Another important feature of the present invention, also related to the use of layers, is that not all layers need have the same composition. Various constituents can be added to each layer to reduce weight, add strength, lower cost, reduce stresses and produce a finer final layer.

Still another important feature of the present invention is that, because high quality optical reflectors can be made using the present technique of spin casting in progressively thinner layers, it is possible to quickly produce a reflector with a different focal length simply by changing the rate of rotation. A faster rotation rate will result in a shorter focal length. Changing the focal length of traditionally cast polymeric reflectors involved making a new mold.

Other features and their advantages will be apparent to those skilled in the art of optical reflector and mirror manufacture from a careful reading of the Detailed Description of Preferred Embodiments, accompanied by the following drawings.

BRIEF DESCRIPTION OF THE DRAWINGS

In the drawings.

The file of this patent contains at least one drawing executed in color. Copies of this patent with color drawing (s) will be provided by the Patent and Trademark Office upon request and payment of the necessary fee.

DETAILED DESCRIPTION OF PREFERRED EMBODIMENTS

Figure 1:
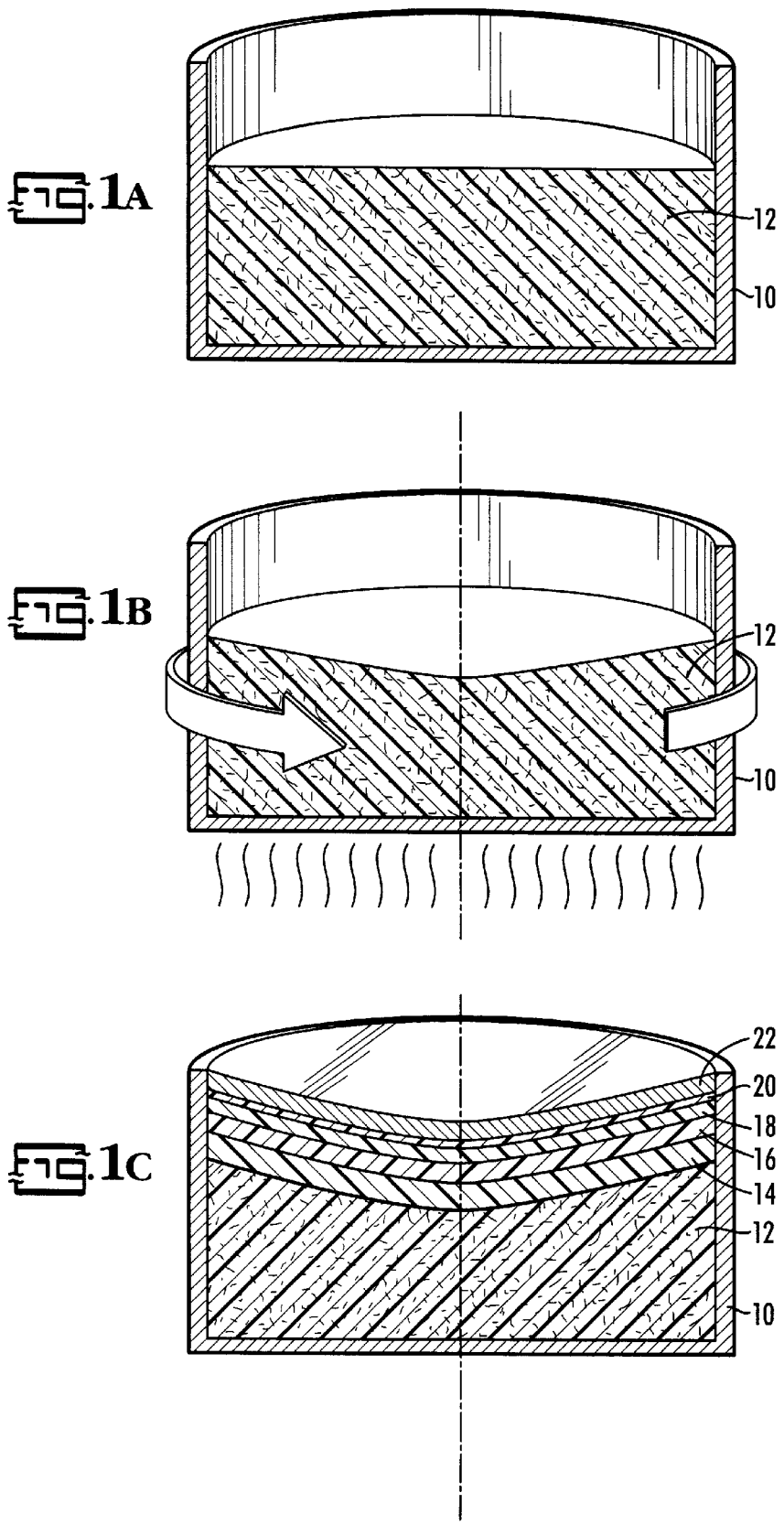
FIG. 1A–1C illustrate the method of making a polymeric parabolic reflector according to a preferred embodiment of the present invention.
Figure 2:
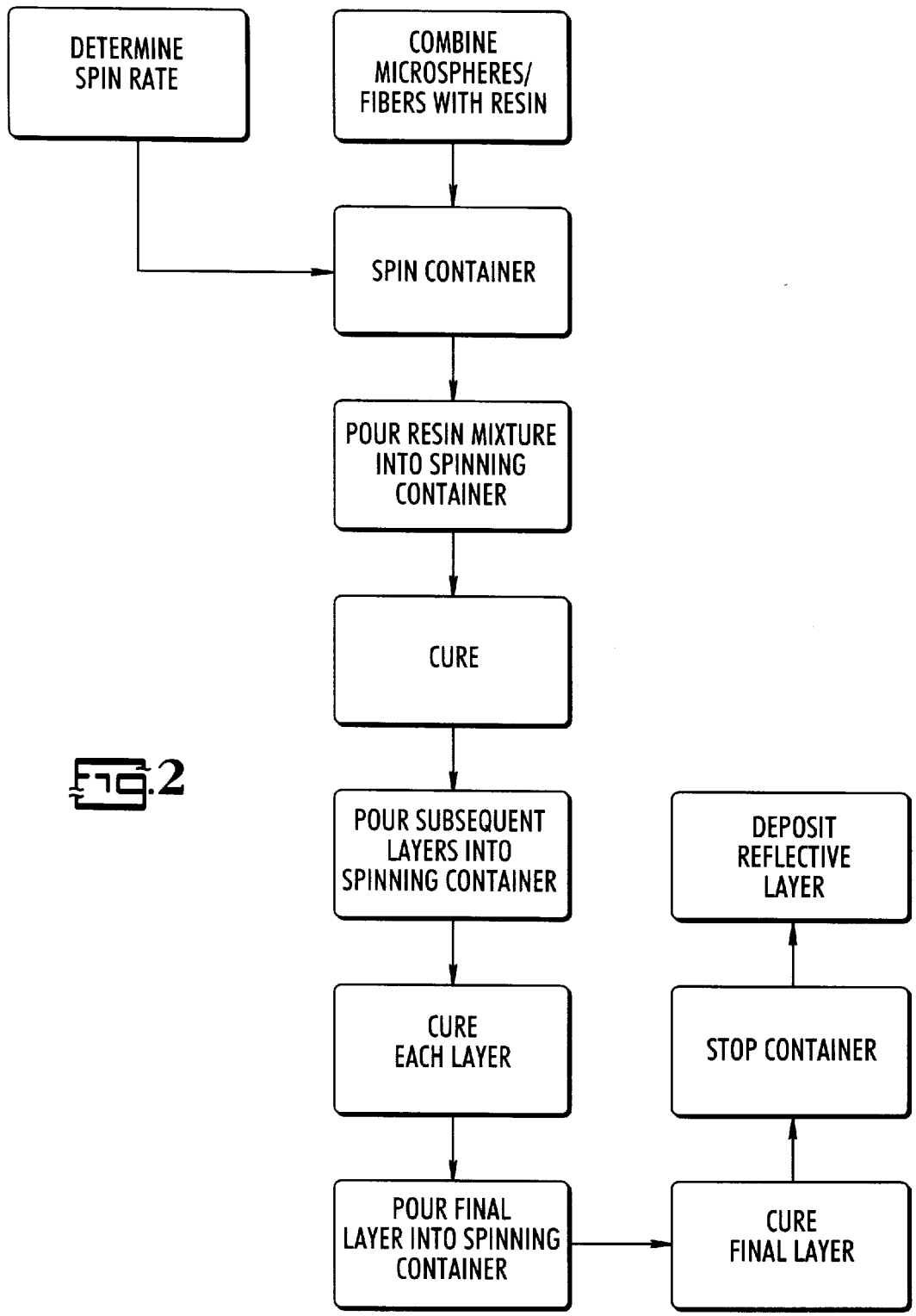
FIG. 2 is a flow chart describing the steps of making a polymeric reflector according to a preferred embodiment of the present invention.
Figure 3:
FIG. 3 is a digital photograph illustrating the clarity and resolution of an image produced by a preferred embodiment of the present invention.

The present invention is a method for making polymeric reflectors, both flat and curved, and the product reflector resulting from the method. By the term reflector, we mean an object having a surface that specularly reflects a large fraction of electromagnetic radiation incident upon that surface; the term includes mirrors, but is not limited to visible light reflection. However, the present invention can be used to produce quality visible wavelength images. Referring to FIG. 3, a digital photograph illustrating the clarity and resolution of an image produced by a preferred embodiment of the present invention demonstrates such visible light imaging capability. The present method will be described in the context of parabolic mirrors, but it will be clear that flat mirrors can also be made according to the present invention simply by not rotating the resin layers as they are being formed and cured. The present process can also be used to make cylindrical mirrors where the reflective surface is on the inside of the cylinder by rotating the container of resin at high speeds or at moderate speeds in a gravity-free environment. Furthermore, by moving the resin in some other way during curing, for example, by vibrating the resin in a manner that sets up standing waves, other curved mirrors may be obtained for purposes where such shapes are desirable. Therefore, although a parabolic mirror will be described in the following detailed description, the present invention is not limited to parabolic mirrors.

Within the scope of this invention, a polymeric reflector is essentially composed of polymeric resin, or simply polymer, that has been cured to the solid state. The term polymer, or polymer resin, is well-understood by practitioners of the art of polymer chemistry to mean any number of substances, with or without additives, composed essentially of giant molecules formed by the chemical union of simple molecules through a polymerization reaction. However, the present invention is not limited to polymeric reflectors; this method may be used to produce reflectors composed partially of cured polymer resin and partially of other materials. Organic and inorganic glasses may also be used according to the present method.

A polymeric, parabolic mirror is made, according to the present invention, by casting polymeric compositions in layers in a container 10 that is being spun at a preselected rate. The curvature is described by the equation $z=(2\pi^2v^2r^2)/g$, where $v$ is the rate of rotation in Hz and $g$ is the local gravitational acceleration. The resulting shape is a paraboloid characterized by focal length $f=g/(8\pi^2v^2)$. If the container is large and the resin not very viscous, laminar effects may be neglected. Alternatively, the desired speed of rotation can be obtained by moving a very small light source to the desired focal point along the axis of rotation and then determining the speed of rotation at which the light is reflected uniformly from the spinning surface. With either approach, the spin rate can be selected before the resin composition is cast in the spinning container.

Container 10 can be a permanent holder for the cast reflector or a mold coated with any one of many release agents to allow the reflector to be removed after it is cast. The rotating device is preferably controllable so that the preselected spin rate can be obtained and maintained throughout without fluctuations or vibrations during curing and without reduction of speed as a new layer is applied.

The atmosphere above the surface of the topmost layer as the layers are added must be kept free of particulate such as dust, and water vapor. Preferably, the air in the environment is filtered using high efficiency particulate absorber (HEPA) filters. Most preferably, the atmosphere is not air but is inert and free of water vapor, oxygen and carbon dioxide. Gases such as nitrogen, argon, or helium, that are free of water, carbon dioxide, and oxygen are most preferred as an environment above the topmost layer.

In order to have control over the atmospheric environment, having a turntable for spinning container 10 in a reactor would be preferable. In addition to enabling the atmospheric environment to be strictly controlled, there are other advantages to the use of a reactor with its confined interior space. A reactor would permit control over atmospheric pressure in the vicinity of the container, for example, in order to be able to reduce the atmospheric pressure for degassing purposes or to increase the pressure in order to help reduce cure shrinkage.

There are other techniques that can be applied to obtain a reflector of superior quality. For example, one could treat the reflector with ultraviolet, infrared, or microwave radiation to alter cure behavior. Finally, one could evaporatively coat or sputter a variety of reflective, dielectric, or protective coatings onto the surface. In the preferred embodiment of the present invention, the surface is coated with a reflective coating 22 of aluminum. Other reflective materials may be used to coat the surface, such as chromium, copper, gold, indium, nickel, palladium, silver, tungsten, vanadium, and white gold; however, this list is not limitative.

Reflectors may also be made, according to alternative embodiments of the present invention by carefully pouring inert liquids (aliphatic, aromatic, silicone, etc.) on top of the curing resin composition rather than employing an inert gaseous atmosphere. If the product reflector needs to be thin and shell-like, the resin composition may be poured over spinning inert liquids (mercury, fluorocarbon, etc.) and cured in place.

A variety of resins currently available may be used as a basis for each layer's resin composition. Ultimately, new resins may be developed specifically for application as one or more of the layers of the present reflector in order to optimize time/temperature profiles of the resin cure, and have specialty monomers with the appropriate reaction rates, physical properties, and cure shrinkage, to give optimum optical surfaces. An ideal polymer resin would be low viscosity, low vapor pressure, low shrinkage, low residual stress, and have a slow, controlled cure. Reasonable results can be obtained with dozens of currently available polymeric resins.

One example of a polymeric resin that should produce a suitable reflector is the epoxy resin: a diglycidyl ether of a substituted naphthalene diol. This molecule would be fairly reactive to amine curing agents, its bicyclic aromatic nature would give it good chemical and thermal stability and R substituents at the 1,5 positions could be varied to tune the crystalinity and viscosity of the system. One example that should be an effective curing agent is an aromatic amine joined by a spiroorthocarbonate moiety. The reactivity and functionality of this molecule can be varied by changing the R and R" groups. By making either or both groups hydrogen, one can change the curing agent from a di- to a tri- or tetra-functional system, thus modifying the degree of cross-linking. If R' and/or R" are large groups, they can sterically hinder the amine, altering the cure kinetics. The spiroorthocarbonate functionality in the middle of the molecule can doubly ring-open at high temperatures, acting as a cross-inking agent. Such ring-opening systems are known to reduce cure shrinkage and stress in thermoset polymerizations.

The polymeric composition of the first, or initial, layer 12 is not as critical from an optical standpoint as the subsequent (14, 16, and 18), and final (20) layers. Early layers can simply be made from the appropriate addition reaction of monomers such as free-radical, epoxy, or metathesis polymerization, but any polymerization techniques that does not evolve a gas or small molecules during polymerization is useable. Preferably, however, the layers (12, 14, 16, 18, and 20) of the present reflectors are made of expanding monomers (i.e. spiroorthocarbonates, benzoxazines and other ring opening polymerizations) to minimize cure shrinkage and stress, and therefore, surface imperfections.

For the initial layer 12, however, resin may be combined with various fillers to increase strength, decrease weight or decrease cost, or modify any other property of the final reflector. For example, the addition of glass microspheres will decrease weight; the addition of fibers will increase strength. Other fillers include fibers or cloth made from organic or inorganic materials such as glass, graphite, boron, and polymeric fibers such as polyester, polyamide, polyethylene, polypropylene, polystyrene, poly-paraphenylene terephthalamide, poly-metaphenylene diamine polytetrafluoroethylene, and high-modulus polyethylene; however this list is not limitative. The initial layer 12 may also be foamed to reduce weight by the addition of blowing agents.

Resin compositions can also include surfactants, reaction accelerators or sensitizers, or chemicals such as oxygen or radical scavengers are preferred. These can be added to the monomers during polymerization.

The initial layer 12 is added to container 10 and allowed to stabilize and cure at temperature for the length of time required to completely cure that particular resin composition while container 10 is spinning. Container 10 is preferably spinning (or oscillating) when initial layer 12, and subsequent layers, are added. Time-Temperature-Transformation diagrams are available for a wide variety of castable resins from the manufacturer. These would serve as a guide for planning cure times and temperatures for a proper cure. Curing temperatures above ambient may be established by heating.

Subsequent layers 14, 16, 18, and 20, may by repeating the steps of pouring and curing for initial layer 12, are progressively thinner Preferably at least three layers are used with the thinnest approaching 1 mm or less in thickness so that shrinkage and resulting surface imperfections associated with most polymerizations are minimized. Layers 12, 14, 16, 18, and 20 are cured at a temperature within the glass transition range of the final layer 20. The glass transition range is the temperature range greater than 50° C. below the glass transition point. The term glass transition point is well-understood by practitioners of polymer chemistry to mean the temperature of the transition between the glassy phase and rubbery phase of a particular polymer. The glass transition point of a polymer can be measured by differential scanning calorimetry (DSC), dynamic mechanical analysis, or variable-temperature rheometry.

In a preferred embodiment of this invention, the layers of the reflector are fully cured by heating within the glass transition range of the polymer of final layer 20; each layer may be composed of the same, or of a different, polymer. In a more preferred embodiment of the invention, the layers are fully cured by heating each layer within the glass transition range of its polymer before forming the subsequent layer. Again, each layer may be composed of the same, or of a different, polymer. In the most preferred embodiment of the invention, the layers are fully cured by heating each layer within the glass transition range of its polymer before forming the subsequent layer, and each subsequent layer is formed of a polymer with a glass transition point that is below the glass transition point of the polymer of the preceding layer; each layer is cured by heating the polymer at a temperature within its glass transition range, but below the glass transition point of the polymer of the preceding layer so that, as each layer is cured, the underlying layers do not become soft and rubbery.

To make superior polymeric optical surfaces, one must minimize the residual stresses left in the polymer during the cure. Thermoset polymer systems undergo a variety of physical and chemical changes during the conversion from monomer to cross-linked polymer product. Time-Temperature-Transformation (TTT) diagrams qualitatively describe these changes. The precise pathway taken through the TTT diagram can have dramatic effects on the physical properties of the final product, however. For example: one pathway might yield a product with poor surface properties because it entered the gel state too early in the cure; another pathway may result in a product with poor thermal properties because it never reached 100% conversion; and a third pathway, however, may produce a polymer with the optimum properties desired.

The choice of path that is best for a given application depends primarily on the choice of resin composition. Furthermore, the addition of surfactants, fibers, and fillers, can alter cure behaviors and final physical properties in ways that are difficult to predict and will inevitably require a modest degree of experimentation by those of ordinary skill.

After forming all layers 12, 14, 16, 18, and 20 are cured, the top surface of final layer 20 is subject to application of a reflective coating 22, such as an aluminum layer applied by vapor deposition, itself a well known technique.

Many modifications and substitutions can be made to the preferred embodiments described above without departing from the spirit and scope of the invention, defined by the appended claims.

What is claimed is:

1. A method of manufacturing a reflector, said method comprising the steps of:

(a) introducing an initial layer into a container having a floor;

(b) curing said initial layer;

(c) introducing an intermediate layer onto said initial layer, wherein said intermediate layer is thinner than said initial layer;

(d) curing said intermediate layer;

(e) introducing a final layer onto said intermediate layer, wherein said final layer is thinner than said intermediate layer; and (f) curing said final layer.

2. The method of manufacturing a reflector, as recited in claim 1, wherein said initial layer, said intermediate layer and said final layer each have a glass transition range, and wherein Step (b) is performed by curing said initial layer to a solid state while heating at a temperature within the glass transition range of said initial layer, wherein Step (d) is performed by curing said intermediate layer to a solid state while heating at a temperature within the glass transition range of said intermediate layer, and wherein Step (f) is performed by curing said final layer to a solid state while heating at a temperature within the glass transition range of said final layer.

3. The method of manufacturing a reflector, as recited in claim 2, wherein Step (d) is performed by curing said intermediate layer to a solid state while heating at a temperature within the glass transition range of said intermediate layer, but not greater than the glass transition point of said initial layer, and wherein Step (f) is performed by curing said final layer to a solid state while heating at a temperature within the glass transition range of said final layer, but not greater than the glass transition point of said intermediate layer.

4. The method as recited in claim 1, wherein said container is rotated along an axis through said floor of said container during Step (b), Step (d), and Step (f).

5. The method as recited in claim 4, wherein said container is under the influence of a constant force parallel to said axis of rotation.

6. The method as recited in claim 1, further comprising the step of:

(g) applying a reflective coating to said final layer

7. The method as recited in claim 1, further comprising the step of:

(h) adding a filler to said initial layer before curing said initial layer, said filler selected from the group consisting of glass microbeads, glass fibers, graphite fibers, boron fibers, polyester fibers, polyamide fibers, polyethylene fibers, polypropylene fibers, polystyrene fibers, poly-paraphenylene terephthalamide fibers, poly-metaphenylene diamine fibers, polytetrafluoroethylene fibers, and high-modulus polyethylene fibers.

* * * * *